Patented Dec. 15, 1936

2,064,767

UNITED STATES PATENT OFFICE 2,064,767

CONTAINER

Herman R. Thies, Akron, Ohio, assignor to Wingfoot Corporation, Wilmington, Del., a corporation of Delaware No Drawing. Application October 21, 1933
Serial No. 694,643

4 Claims. (Cl. 18—59)

This invention relates to containers for aqueous compositions for human consumption and to other molded articles of manufacture. It relates more particularly to pitchers and tumblers designed particularly for dispensing aqueous and alcoholic beverages and a container for storing and refrigerating such materials.

The containers of this invention are molded from thermoplastic condensation derivatives of rubber. These rubber derivatives have a general $(C_5H_8)_x$ structure in which more carbon atoms are directly connected than in rubber. Containers molded from these rubber derivatives are water- and alcohol-resistant. They are somewhat resilient and not easily broken. The containers now on the market are almost exclusively made of porcelain or glass. The molded containers of this invention are to be preferred to porcelain and glass containers because they are much lighter and not as easily broken and the method of fabricating them offers many advantages over those employed for porcelain and glass containers. They have a very low moisture absorption, are odorless and tasteless, and are unaffected by alcohol. Although various resinous materials have been suggested for the manufacture of such containers they are not altogether satisfactory. Cellulosic molded products are not sufficiently water-resistant to be satisfactorily employed for this purpose. The phenolics impart a taste to the water. The urea materials become dry and crack and if the container is kept filled with water the outside will dry out and crack. Tumblers and mugs molded from materials of the urea resins when used for beer immediately kill the bead; a good bead forms on beer poured into the containers of this invention.

The rubber derivatives of this invention may be made in a variety of ways. A chlorine-containing condensation derivative is preferred as the molding material for making the containers of this invention. Such a rubber derivative may be prepared by reacting rubber with chlorostannic acid and then decomposing the metal addition compound thus formed by pouring it into about three volumes of water. Instead of chlorostannic acid a mixture of hydrochloric acid and stannic chloride or other halide of an amphoteric metal, such as chromic chloride or ferric chloride may be employed in producing the rubber derivative. A somewhat different rubber derivative is formed by reacting rubber with the halide of an amphoteric metal, such as stannic chloride, chromic chloride, aluminum chloride, or ferric chloride to first produce a metallic addition compound of the rubber and then decomposing it to produce a compound which in the purified state appears to have the formula $(C_5H_8)_x$ with more carbon atoms directly united than in rubber.

A chlorine-containing thermoplastic condensation derivative may, for example, be prepared as follows: Pale crepe rubber is plasticized on a rubber mill until it has a plasticity of about 300 as measured by a Williams plastometer. This is dissolved in sufficient benzene to produce a cement containing 10% of rubber. 350 gallons of the cement are placed in a steam-jacketed Day mixer equipped with a reflux condenser and 10% of crystalline hydrated chlorostannic acid $$(H_2SnCl_6.6H_2O)$$

based on the weight of the rubber in the cement is added. This mixture is heated and agitated for several hours at a temperature near the boiling point. The reaction is allowed to progress until a product of desired viscosity is obtained. In general the viscosity of the product will be about 0.20±0.10 minute. A product with a low viscosity, for example a viscosity of 0.15 minute is preferred since containers formed from the molding material produced from such a product will withstand boiling in water better than molded products formed from material obtained by reacting the rubber to a product of higher viscosity. When a product of the desired viscosity is obtained the reaction may be terminated by adding ½ pound of water for each pound of chlorostannic acid used. The reaction mixture is then quenched in a large volume of water, for example 2½ gallons of water for each gallon of cement and the water is vigorously agitated during the adding of the cement to produce an emulsion. This emulsion is cooled and filtered and then steam distilled to remove the benzene. During the steam distillation the emulsion is agitated and the molding material precipitates as a fine, sand-like material.

The viscosities referred to herein refer to measurements at 25° C. on a Gardner mobilometer having the following dimensions:

| | |
|---|---|
| Thickness of plunger disk _____ inch __ | 0.066 |
| Diameter of plunger disk _____ do __ | 1.502 |
| Diameter of plunger shaft _____ do __ | 0.248 |
| Inside diameter of cylinder containing sample _____ inches __ | 1.535 |
| Height of cylinder _____ do ____ | 9.0 |
| Length of plunger shaft _____ do ____ | 20.0 |
| Distance between the two marks on plunger shaft _____ inches __ | 7.484 |
| Total weight of shaft, top weight and disk _____ grams __ | 68.6 |

By a similar reaction a suitable molding material may be prepared from tin tetra chloride. The molding material prepared by either reaction may be colored by soluble dyestuffs or by the incorporation of a pigment. The dye or pigment is advantageously incorporated by milling on a rubber mill. By adding a small percent of a metallic powder, such as powdered aluminum or bronze and preferably a dyestuff, milling the dye and metallic powder into the rubber derivative on a rubber mill and then molding with heat and pressure a product which exhibits a pleasing pearlescent effect may be obtained. Plasticizers such as wax, etc. and fillers such as asbestos, etc. may be incorporated in the molding material by milling on a rubber mill, if desired. With materials, such as chlorostannic acid and tin tetra chloride, a substantially colorless molding material is obtained. With other reagents, such as ferric chloride or ferric chloride and hydrochloric acid a colored product is obtained.

Molded containers prepared from these materials are advantageously dipped for five or preferably ten minutes in chlorine water which is approximately $\frac{1}{10}$ normal in strength to improve their surface and make them more resistant to oils, etc.

Tumblers and pitchers, etc. may be molded from these thermoplastic materials in any suitable way. Molding at 1000 pounds pressure using a temperature of 300° F. for a material with a viscosity of 0.15 minute and a higher or lower temperature for products of lower or higher viscosity gives satisfactory results.

A container for ice water for use in refrigerators may, for example, be made of a general cylindrical shape or box shape. Containers of various sizes may be made but in general a container measuring about 5 inches by 6 inches by 10 inches will be found most satisfactory for the average size family. A cylindrical container may be designed to stand on its side or to stand on one end. If it is to stand on its side both ends are advantageously permanently fastened to the cylindrical body portion. If the container is to be stood on one end the cover may be made to screw onto the body portion, or merely rest on it. If preferred the body portion and one end may be molded in a single piece. In a box-like container the lid may be made to fit closely onto the body portion or it may be permanently fastened to the body portion. The container is advantageously equipped with a suitable faucet. If the cover of the container is permanently fastened to the body portion the faucet may be arranged in a removable plug so that the container may be filled by removing the plug, or a separate opening may be provided for filling the container.

In order to seal one or both ends of the container to the body portion, one or both of the surfaces which are to come in contact when sealed is brushed with benzene or gasoline or other suitable solvent and the two pieces are then held together in a jig press or with other suitable clamping means until the solvent has evaporated. Instead of using benzene or gasoline a cement made by dissolving the rubber derivative in benzene or other suitable solvent may be used to permanently join the pieces together. If the container is made in the form of a cask the body portion and the end or ends to be cemented to it may be provided with screw threads so that after applying the solvent or cement they may be screwed onto the body portion and a permanent tight seal thus formed. In forming either a cylindrical or box-like container, pieces which are to be cemented together are advantageously provided with tightly fitting grooves and flanges or other indentations and complementary projections to insure a tight joint.

Such a container is suited for use in a refrigerator for cooling drinking water. If an alcoholic beverage is to be stored in the container, a suitable inlet may be provided for the introduction of a carbonating gas.

It is intended that the patent shall cover by suitable expression in the appended claims whatever features of patentable novelty reside in the invention.

What I claim is:

1. A container for aqueous compositions for human consumption which comprises a joint of two molded pieces of a condensation derivative of rubber, a projection on one of the pieces being fitted into a depression in the other at the joint, and the two pieces being cemented together with said rubber derivative.

2. A container for aqueous compositions for human consumption which comprises a joint of two molded pieces of a condensation derivative of rubber obtained by the action of the halide of an amphoteric metal on rubber, a projection on one of the pieces being fitted into a depression in the other at the joint and the two pieces being cemented together with said rubber derivative.

3. In an article of manufacture two molded pieces of a condensation derivative of rubber bonded together by a condensation derivative of rubber.

4. In an article of manufacture two molded pieces of a condensation derivative of rubber produced by the action of the halide of an amphoteric metal on rubber, the two molded pieces being bonded together by a bond which comprises such a condensation derivative of rubber.

HERMAN R. THIES.